(12) United States Patent
Baier et al.

(10) Patent No.: US 7,962,440 B2
(45) Date of Patent: Jun. 14, 2011

(54) ADAPTIVE INDUSTRIAL SYSTEMS VIA EMBEDDED HISTORIAN DATA

(75) Inventors: John J. Baier, Mentor, OH (US); Taryl J. Jasper, South Euclid, OH (US); John T. Campbell, Bridgeville, PA (US); Robert J. McGreevy, Oswego, IL (US); Frank Anthony Palmieri, Jr., Gibsonia, PA (US); Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 929 days.

(21) Appl. No.: 11/862,861

(22) Filed: Sep. 27, 2007

(65) Prior Publication Data

US 2009/0089231 A1  Apr. 2, 2009

(51) Int. Cl.
*G06F 15/00* (2006.01)
*G06F 15/18* (2006.01)

(52) U.S. Cl. .................................................... 706/62
(58) Field of Classification Search ................ 706/45
See application file for complete search history.

(56) References Cited

U.S. PATENT DOCUMENTS

| | | | |
|---|---|---|---|
| 4,510,565 A | 4/1985 | Dummermuth |
| 4,553,205 A | 11/1985 | Porchia |
| 4,616,333 A | 10/1986 | Shimoni |
| 4,718,025 A | 1/1988 | Minor et al. |
| 4,731,735 A | 3/1988 | Borgendale et al. |
| 4,773,028 A | 9/1988 | Tallman |
| 4,831,529 A | 5/1989 | Miike et al. |
| 4,975,865 A | 12/1990 | Carrette et al. |
| 5,003,469 A | 3/1991 | Kamiyama et al. |
| 5,051,932 A | 9/1991 | Inove et al. |
| 5,274,781 A | 12/1993 | Gibart |
| 5,452,201 A | 9/1995 | Pieronek et al. |
| 5,568,383 A | 10/1996 | Johnson et al. |
| 5,805,442 A | 9/1998 | Crater et al. |
| 5,901,323 A | 5/1999 | Milliken et al. |
| 5,943,675 A | 8/1999 | Keith et al. |
| 5,991,793 A | 11/1999 | Mukaida et al. |

(Continued)

FOREIGN PATENT DOCUMENTS

EP  0490864  6/1992

(Continued)

OTHER PUBLICATIONS

"Major Canadian Natural Gas Producer Buys AnyWhere/AnyTime Services from Industrial Evolution" Mar. 12, 2001, Industrial Evolution pp. 1.

(Continued)

*Primary Examiner* — Donald Sparks
*Assistant Examiner* — Li-Wu Chang
(74) *Attorney, Agent, or Firm* — Turocy & Watson LLP; William R. Walbrun; John M. Miller

(57) ABSTRACT

Systems and methods that provide for adaptive processes in an industrial setting. Historian data, in conjunction with current collected data, can be converted into decision making information that is subsequently employed for modifying a process in real time. A process trend component, which is associated with a controller, can access historian data (e.g., trends collected via historians) to determine/predict an outcome of a current industrial process. Such enables a tight control and short reaction time to correcting process parameters.

18 Claims, 11 Drawing Sheets

U.S. PATENT DOCUMENTS

| | | | |
|---|---|---|---|
| 6,092,036 A | 7/2000 | Hamann | |
| 6,110,214 A | 8/2000 | Klimasauskas | |
| 6,139,201 A | 10/2000 | Carbonell et al. | |
| 6,198,480 B1 | 3/2001 | Cotugno et al. | |
| 6,204,782 B1 | 3/2001 | Gonzalez et al. | |
| 6,219,649 B1 | 4/2001 | Jameson | |
| 6,233,623 B1 | 5/2001 | Jeffords et al. | |
| 6,252,589 B1 | 6/2001 | Rettig et al. | |
| 6,263,487 B1 | 7/2001 | Stripf et al. | |
| 6,298,393 B1 | 10/2001 | Hopsecger | |
| 6,298,454 B1 | 10/2001 | Schleiss et al. | |
| 6,385,496 B1 | 5/2002 | Irwin et al. | |
| 6,411,987 B1 | 6/2002 | Steger et al. | |
| 6,505,247 B1 | 1/2003 | Steger et al. | |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2 | 6/2003 | Carey et al. | |
| 6,584,488 B1 | 6/2003 | Brenner et al. | |
| 6,618,856 B2 | 9/2003 | Coburn et al. | |
| 6,633,782 B1 | 10/2003 | Schleiss et al. | |
| 6,701,324 B1 | 3/2004 | Cochran et al. | |
| 6,754,668 B2 | 6/2004 | Noble et al. | |
| 6,754,885 B1 | 6/2004 | Dardinski et al. | |
| 6,766,214 B1 | 7/2004 | Wang et al. | |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,847,854 B2 | 1/2005 | Discenzo | |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,050,873 B1 | 5/2006 | Discenzo | |
| 7,069,201 B1 | 6/2006 | Lindner et al. | |
| 7,152,222 B2 | 12/2006 | Kumhyr et al. | |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2 | 4/2008 | Jackson et al. | |
| 7,406,453 B2 | 7/2008 | Mundie et al. | |
| 7,546,577 B2 | 6/2009 | Do et al. | |
| 7,568,184 B1 | 7/2009 | Roth | |
| 7,574,417 B1 | 8/2009 | McGreevy et al. | |
| 7,584,216 B2 | 9/2009 | Travieso et al. | |
| 7,616,095 B2 | 11/2009 | Jones et al. | |
| 7,620,885 B2 | 11/2009 | Moulckers et al. | |
| 7,627,385 B2 | 12/2009 | McGreevy et al. | |
| 7,672,740 B1 | 3/2010 | Baier et al. | |
| 7,684,876 B2 | 3/2010 | Grgic | |
| 7,693,585 B2 | 4/2010 | Kalan et al. | |
| 7,742,833 B1 | 6/2010 | Herbst et al. | |
| 2002/0019839 A1 | 2/2002 | Shiu | |
| 2002/0069235 A1 | 6/2002 | Chen | |
| 2002/0120744 A1 | 8/2002 | Chellis et al. | |
| 2002/0133523 A1 | 9/2002 | Ambler et al. | |
| 2002/0169907 A1 | 11/2002 | Candea et al. | |
| 2002/0174263 A1 | 11/2002 | Codd et al. | |
| 2002/0184601 A1 | 12/2002 | Fitzhenry et al. | |
| 2002/0184610 A1 | 12/2002 | Chong et al. | |
| 2003/0014130 A1 | 1/2003 | Grumelart | |
| 2003/0041135 A1* | 2/2003 | Keyes et al. | 709/223 |
| 2003/0100958 A1 | 5/2003 | Cachat et al. | |
| 2003/0101208 A1 | 5/2003 | Chauvel et al. | |
| 2003/0130899 A1* | 7/2003 | Ferguson et al. | 705/26 |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2004/0225649 A1 | 11/2004 | Yeo et al. | |
| 2005/0071755 A1 | 3/2005 | Harrington et al. | |
| 2005/0085928 A1 | 4/2005 | Shani | |
| 2005/0198034 A1 | 9/2005 | Boyer | |
| 2005/0198406 A1 | 9/2005 | Sichner | |
| 2005/0203648 A1 | 9/2005 | Martin | |
| 2005/0210337 A1 | 9/2005 | Chester et al. | |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0161268 A1 | 7/2006 | Frensch et al. | |
| 2006/0259160 A1 | 11/2006 | Hood et al. | |
| 2006/0259499 A1 | 11/2006 | Moulckers et al. | |
| 2006/0291283 A1 | 12/2006 | Jin et al. | |
| 2006/0294502 A1 | 12/2006 | Das et al. | |
| 2007/0006039 A1 | 1/2007 | Fichter et al. | |
| 2007/0027913 A1 | 2/2007 | Jensen et al. | |
| 2007/0028070 A1 | 2/2007 | Avergun et al. | |
| 2007/0038610 A1 | 2/2007 | Omoigui | |
| 2007/0050348 A1 | 3/2007 | Aharoni et al. | |
| 2007/0073744 A1 | 3/2007 | McVeigh et al. | |
| 2007/0112447 A1 | 5/2007 | McGreevy et al. | |
| 2007/0112801 A1 | 5/2007 | McGreevy et al. | |
| 2007/0136533 A1 | 6/2007 | Church et al. | |
| 2007/0142941 A1 | 6/2007 | McGreevy et al. | |
| 2007/0156770 A1 | 7/2007 | Espelien | |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2007/0294078 A1 | 12/2007 | Kim et al. | |
| 2008/0027678 A1 | 1/2008 | Miller | |
| 2008/0082577 A1 | 4/2008 | Hood et al. | |
| 2008/0126408 A1 | 5/2008 | Middleton | |
| 2008/0313228 A1 | 12/2008 | Clark et al. | |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

Real Time Intelligence at the Source-Deploying and EMbedded Historian. Users Conference 2005, pp. 1.

Miller, et al. "Extending the Reach of Enterprise Data Management in a World of M2M." ISA Expo. Oct. 2005, pp. 1-7.

"Proficy Historian"; Dec. 16, 2004, GE FANUC, pp. 1-8.

European Search Report dated Feb. 22, 2008 for European Patent Application Serial No. EP 07 11 7388, 1 Page.

European Search Report dated Jan. 20, 2009 for European Patent Application No. EP08156281, 6 Pages.

EP Office Action for Application No. 08165215.8-1243 dated Mar. 3, 2009, 2 pages.

European Search Report and Written Opinion for European Application No. EP 08 16 5215, dated Dec. 8, 2008, 6 pages.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

European Search Report dated Feb. 5, 2008 for European Patent Application No. EP07117614, 8 pgs.

Alvestrand. "Tags for the Identification of Languages: rfc 1766.txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

European Search Report dated May 2, 2008 for European Patent Application No. EP07117622, 3 pgs.

Power RICH System, Enterprise Edition, Historian (PRS EE Historian) Version 1.5, last accessed Dec. 3, 2008, 15 pages.
Wonderware Plant Intelligence Solution Helps Arla Foods Deliver Fresh Milk Products to the Tables of Europe. Last accessed Dec. 3, 2008, 4 pages.
European Search Report dated Dec. 18, 2007 for European Patent Application Serial No. 07117364.5-2221, 2 Pages.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Dec. 3, 2008 for U.S. Appl. No. 11/536,566, 35 pages.
OA dated Jan. 4, 2010 for U.S. Appl. No. 11/558,710, 37 pages.
CN OA Due Dec. 29, 2008 for Chinese Patent Application No. 200710162327.9, 6 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Mar. 24, 2010 for U.S. Appl. No. 11/750,193, 36 pages.
European Search Report dated Mar. 10, 2010 for European Application Serial No. EP 08 16 4957, 7 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.

Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
OA dated Jun. 25, 2010 for U.S. Appl. No. 11/862,182, 41 pages.
OA dated May 27, 2010 for U.S. Appl. No. 11/537,110, 77 pages.
OA dated Jul. 22, 2010 for U.S. Appl. No. 11/862,183, 39 pages.
A new general purpose compression method for searching in large collection, Bhadade, U.S.; Sharma, V.K.; Trivedi, A. I.; TENCON 2007—2007 IEEE Region 10 Conference Digital Object Identifier: 10.11 09ITENCON.2007.4428935. Publication Year: 2007 , pp. 1-4.
Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM2009.151, Publication Year: 2009 , pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4. Digital Object Identifier: 10.11 09/TPAMI.2008.11 0 Publication Year: 2009 , pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET.2009.5353207 Publication Year: 2009 , pp. 23-28.
Notice of Allowance dated Jun. 13, 2010 for U.S. Appl. No. 11/862,891, 49 pages.
OA dated Jul. 8, 2010 for U.S. Appl. No. 11/558,710, 28 pages.
OA dated Jun. 11, 2010 for U.S. Appl. No. 11/862,180, 27 pages.
OA dated Jul. 23, 2010 for U.S. Appl. No. 11/536,550, 51 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Sep. 3, 2010 for U.S. Appl. No. 11/750,193, 68 pages.
Notice of Allowance mailed Dec. 13, 2010 for U.S. Appl. No. 11/862,180, 74 pages.
OA dated Nov. 19, 2010 for U.S. Appl. No. 12/783,229, 41 pages.
European Search Report dated Oct. 22, 2010 for European Patent Application No. EP 08 16 5010, 10 pages.
OA dated Jan. 4, 2011 for U.S. Appl. No. 11/536,550, 44 pages.
Notice of Allowance mailed Nov. 9, 2010 for U.S. Appl. No. 11/537,110, 38 pages.
OA dated Mar. 22, 2011 for U.S. Appl. No. 121783,229, 14 pages.
OA dated Mar. 21, 2011 for U.S. Appl. No. 12/691,302, 72 pages.
OA dated Mar. 31, 2011 for U.S. Appl. No. 11/537,144, 49 pages.

* cited by examiner

ADAPTIVE INDUSTRIAL SYSTEMS VIA EMBEDDED HISTORIAN DATA

TECHNICAL FIELD

The subject invention relates generally to historian components associated with industrial controllers and more particularly to predicting outcome of industrial processes, via collection of historian data by embedded historians.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

Conventional controllers employ current data gathered from processes to execute a control program or routine and/or further measure process variables/inputs that are representative of status for a controlled process. A typical control routine can be created in a controller configuration environment that has various tools and interfaces. As such, a developer can construct and implement a control strategy using industrial and conventional programming languages or graphical representations of control functionality. In such arrangement, there typically exists a lag time before the controller raises remedial measures to rectify the process, in case of quality assurance problems. In general quality control often occurs at a back end of the process, and there exists likelihood that errors can not be corrected in a timely manner.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for adaptive processes in an industrial setting, wherein data collected (e.g., historical data) can be converted into decision making information, which is subsequently employed for modifying a process in real time. A process trend component (e.g., associated with a controller) can access historical data (e.g., trends collected via historians) to determine/predict an outcome of an industrial process. Such enables a tight control and short reaction time to process parameters, and for a modification thereof. Moreover, issues related to time lags associated with conventional factory controllers can be mitigated, as process parameter can be readily adapted.

In a related aspect, quality analysis can occur ahead of processing and during the control process via employing historian data at various granularity levels. Such granularity levels of data collection/implementation can depend upon factors such as: the nature of the manufacturing process; outcome of the quality control tests; criticality of operation, and the like. Moreover, based on such historian data, the quality control process of the subject innovation can predict outcome of quality for the industrial process, and initiate correction actions in view of current values of data. For example, threshold values can be set to determine and trigger various actions during execution, such as: automatically performing corrective measures and maintenance procedures; invoking embedded files within a process that can be utilized by other components or reviewed by an operator; providing Just-In-Time training to an operator during various stages of the process; spawning other automatic procedures during various stages of industrial production, and the like. By associating historians with quality procedures, timely, tighter and more stringent controls can be applied to various automation processes—thus increasing overall quality in an automated manufacturing environment.

In a related methodology, data can be initially stored via embedded historians, wherein such storage can continue until a predetermined threshold is reached. Upon reaching such predetermined threshold, an automatic download can occur that downloads stored data in such embedded historians to a central plant historian. Upon completion of data transfer to the central plant historian, and based on such collected data, a prediction can be made regarding type of results to be expected from the industrial unit. Subsequently, based on such prediction, relatively immediate actions can be taken to control the industrial process, as process parameter can be readily modified.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
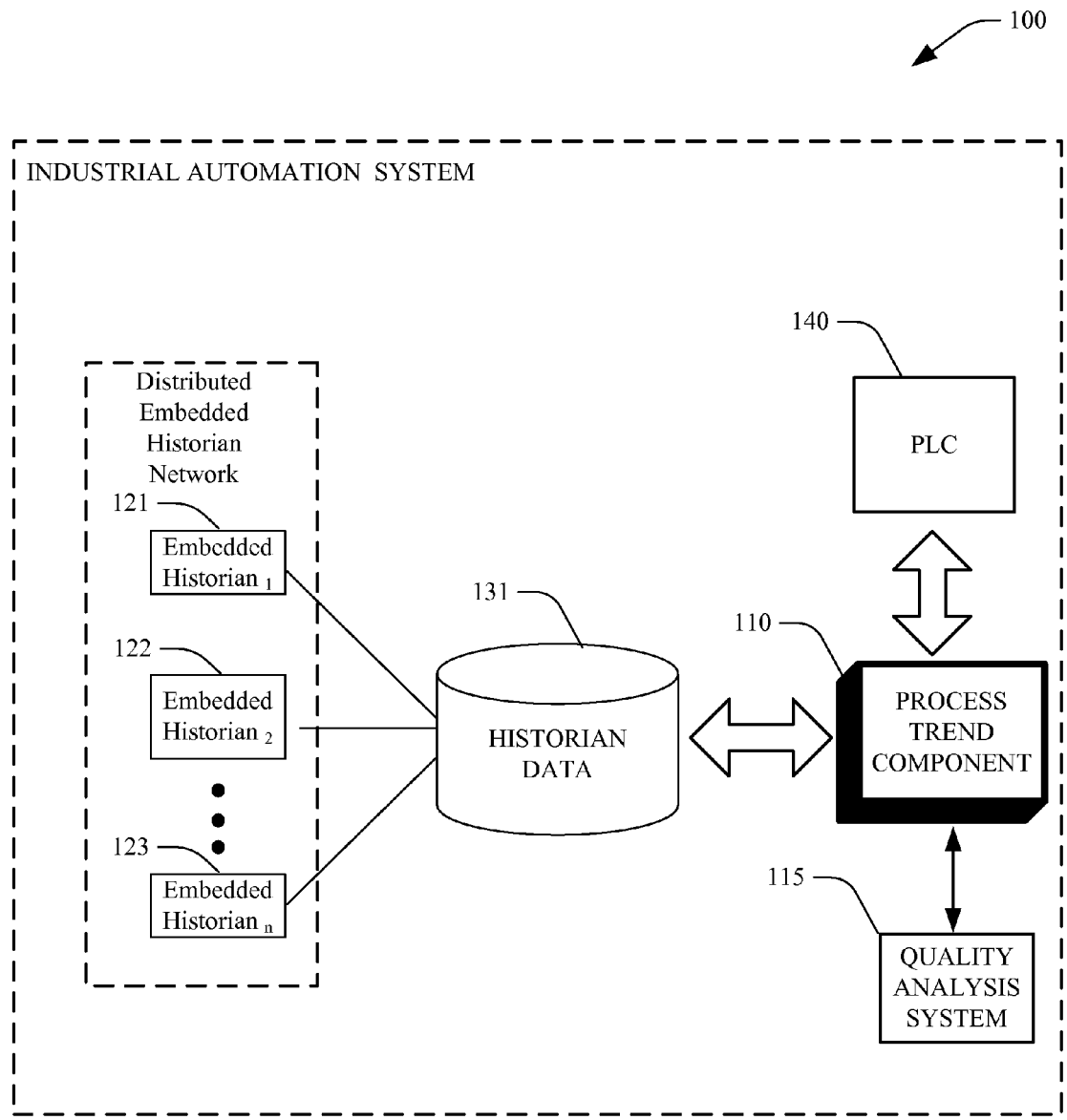
FIG. 1 illustrates an exemplary block diagram of a process trend component that can access historian data to determine and/or predict an outcome of an industrial process.

FIG. 1 illustrates a process trend component 110 that is associated with a plant embedded historian network of an industrial programmer system 100 (e.g., a network of controller devices), to facilitate discovery of history data. Such process trend component 110 can interact with embedded historians 121, 122, 123 (1 thru n, n being an integer) that are distributed on the back plane of an industrial network. Data can be collected via such embedded historians in accordance with an organizational model of a hierarchical system that is distributed across various elements of an enterprise, for example. In contrast to conventional PC historians, embedded historians (e.g., micro historians) of the subject innovation are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians.

The process trend component 110 can supply for adaptive processes in an industrial setting, wherein historian data 131, in conjunction with data collected in real time, can be converted into decision making information that is subsequently employed for modifying the process (e.g., in real time.) The process trend component 110, which can be associated with a programmable logic controller 140 or a controller network, and can access historical data (e.g., trends collected via historians) to determine/predict an outcome of a current industrial process related to the industrial automation system 100. Such an arrangement enables a tight control and short reaction time to modify process parameters, for example. Hence, issues related to time lags associated with conventional factory controllers can be mitigated, as process parameters can be readily modified through the programmable logic controller 140.

Moreover, such process trend component 110 can be associated with a quality analysis system 115 that can generate quality analysis ahead of processing and/or during the control process via employing the historian data 131. Such historian data 131 can further be collected and/or employed for adaptation purposes at various granularity levels—which can depend upon factors such as: the nature of the manufacturing process; outcome of the quality control tests; and the like. Accordingly, based on such historian data 131, the process trend component and/or the quality analysis system of the subject innovation can predict outcome of quality for the industrial process, and initiate correction process in view of current value of data. For example, threshold values can be set to determine and trigger various actions during execution, such as: automatically performing corrective measures and maintenance procedures; invoking embedded files within a process that can be utilized by other components or reviewed by an operator; providing Just-In-Time training to an operator during various stages of the process; and/or spawning other automatic procedures during various stages of industrial production. By associating historians to quality procedures, the subject innovation enables timely, tighter and more stringent controls that can be applied to various automation processes—thus increasing overall quality in an automated manufacturing environment.

Figure 2:
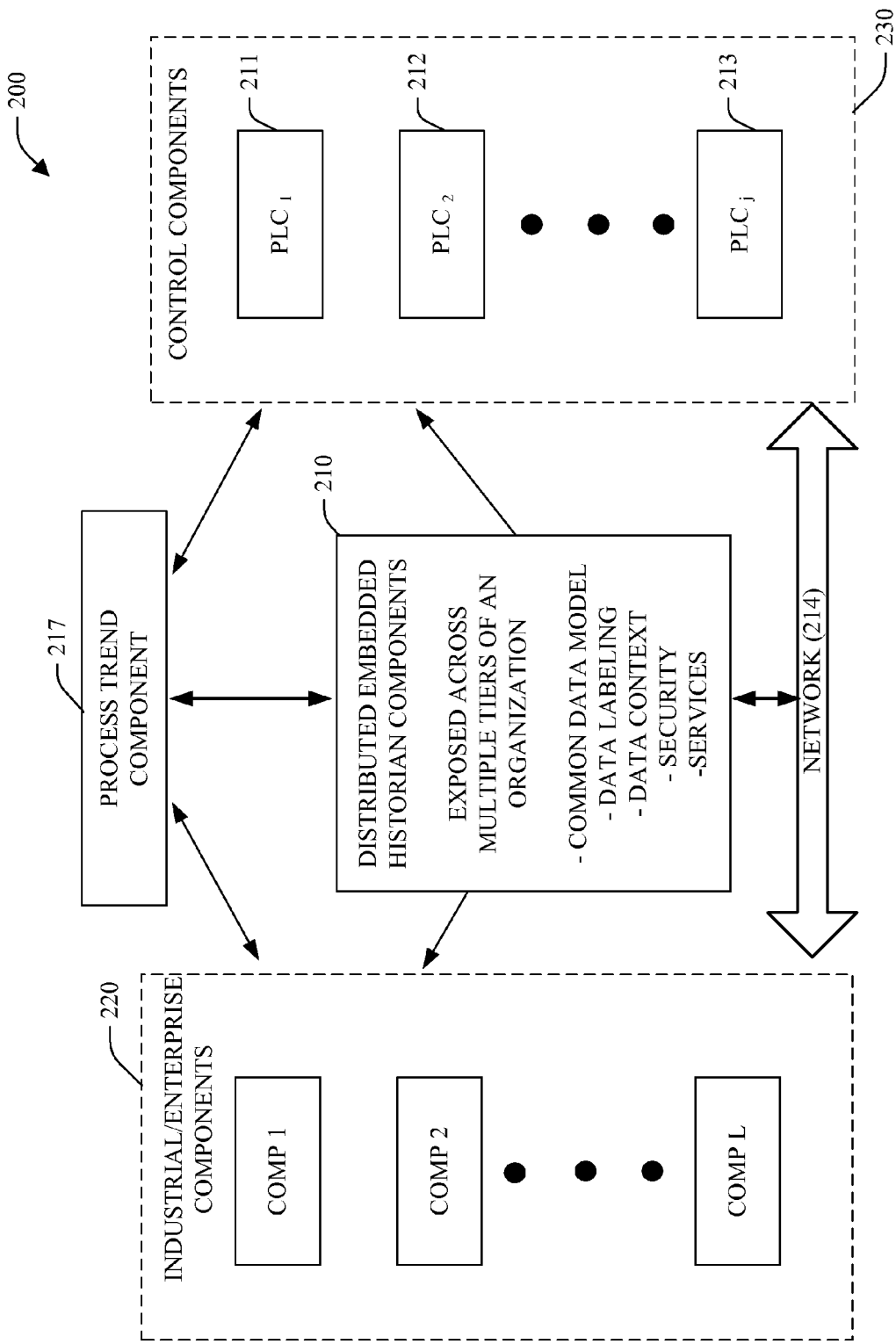
FIG. 2 illustrates a particular block diagram of a process trend component that can employ historian data, in conjunction with data collected in real time.

FIG. 2 illustrates a block diagram of a process trend component 217 that can employ historical data, in conjunction with current collected data. Such data can be converted into decision making information that is subsequently employed for modifying a process in real time. The process trend component 217 can be part of applications running with the control components 211, 212, 213 (1 to j, where J is an integer), which can function as a management control center for the industrial network system 200. Accordingly, data from the distributed embedded historian framework can be collected (e.g., based on configurations of the embedded historians, such as in accordance with an organizational model of a hierarchical system that is distributed across various elements of the industrial automation system/enterprise).

A network system 214 can be associated with the industrial automation system 200, which can further be accessed by the process trend component 217. The network system 200 can further include or interact with additional hosts, which may be personal computers, servers or other types of computers (1 to L, L being an integer). Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

Figure 3:
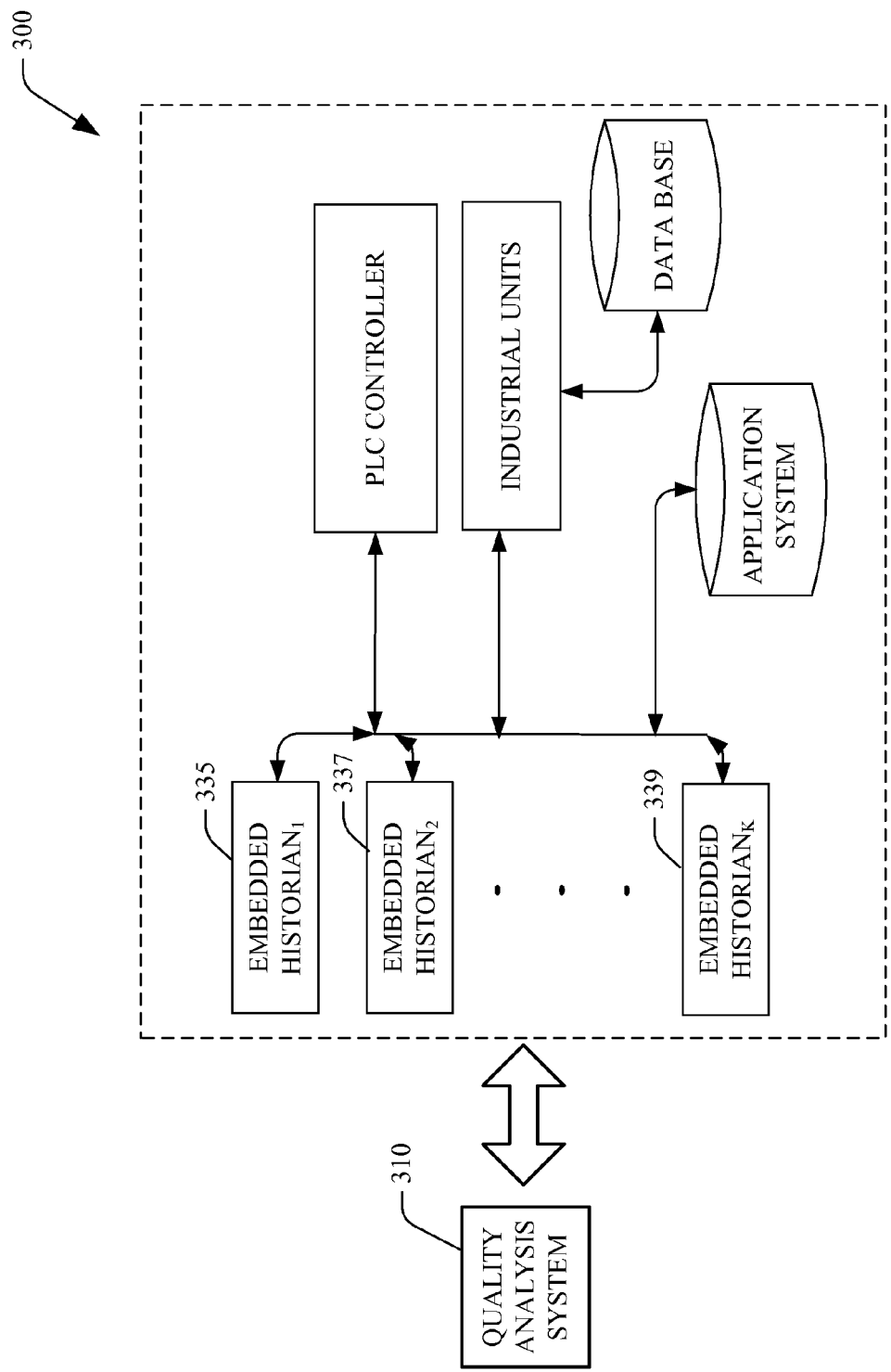
FIG. 3 illustrates a general block diagram of a quality analysis system, in accordance with an aspect of the subject innovation.

FIG. 3 illustrates a general block diagram of a quality analysis system 310, in accordance with an aspect of the subject innovation. The quality analysis system 310 can perform quality analysis ahead of processing and/or during the control process via employing historian data at various granularity levels, which can depend upon factors such as: the nature of the manufacturing process; outcome of the quality control tests; and the like. Moreover, based on such historian data that is collected via the embedded historians 335, 337, and 339 (1 to k, k being an integer), the quality control process of the subject innovation can predict outcome of quality for the industrial process and further initiate correction process in view of current value of data. For example, threshold values can be set to determine and trigger various actions during execution, such as: automatically performing corrective measures and maintenance procedures; invoking embedded files within a process that can be utilized by other components or reviewed by an operator; providing Just-In-Time training to an operator during various stages of the process; and/or spawning other automatic procedures during various stages of industrial production. By associating historians to quality procedures, timely, tighter and more stringent controls can be applied to various automation processes, thus increasing overall quality in an automated manufacturing environment. Data can be initially stored via historians 335, 337, and 339, and such storage can continue until predetermined threshold storage capacities associated with these historians are reached. Upon reaching such predetermined threshold, the stored data (e.g., history data) can be evaluated and the embedded historians 335, 337, and 339 notified to indicate that the data is no longer required and/or is not necessary for future access and hence can be overwritten.

Figure 4:
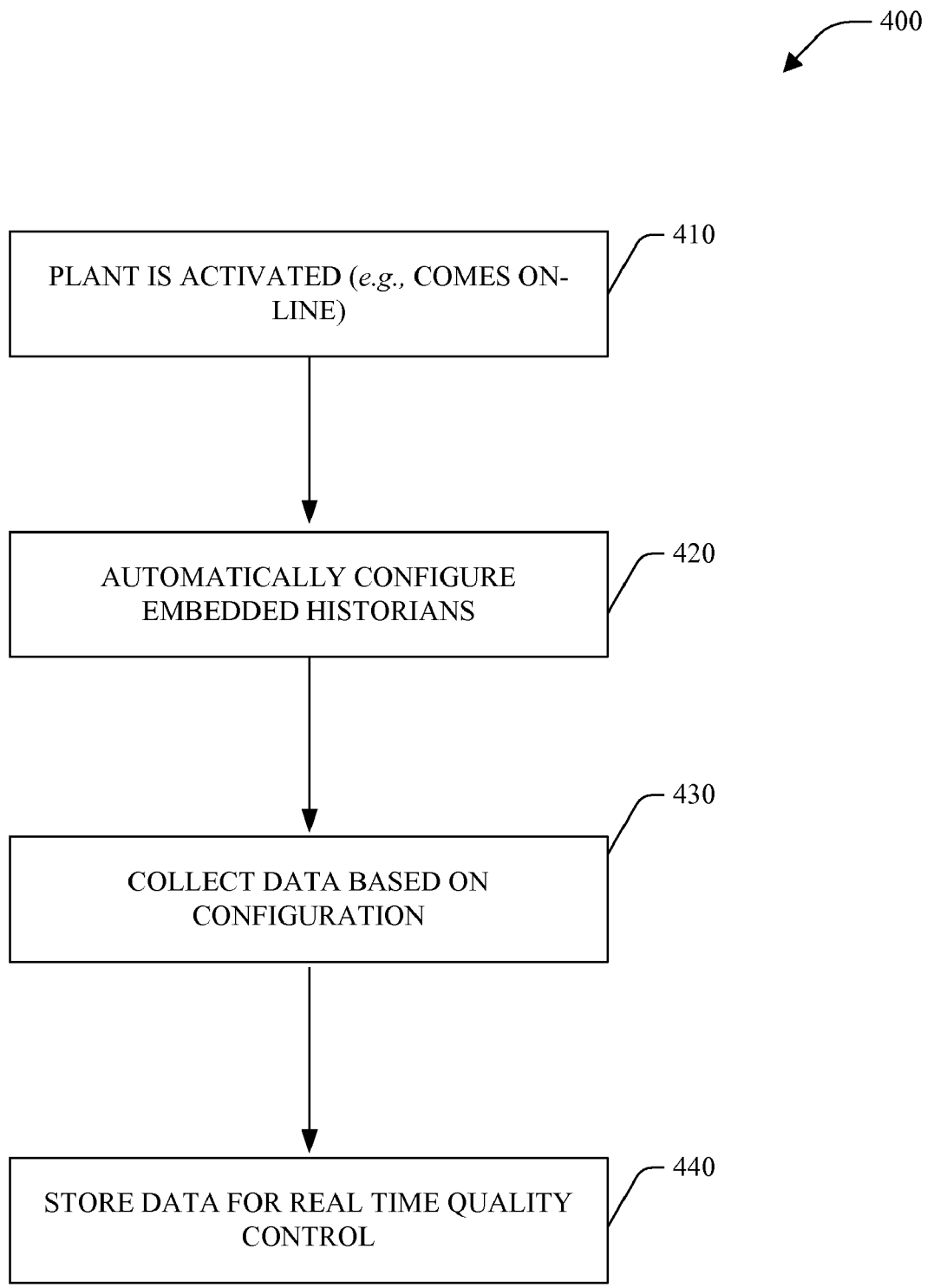
FIG. 4 illustrates an exemplary methodology of quality control in accordance with an aspect of the subject innovation.

FIG. 4 illustrates an exemplary methodology 400 of quality control in an adaptive industrial system according to an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410, an industrial plant that employs a plurality of embedded historians is activated and comes on-line. At 420, such embedded historians can be configured according to a predetermined setting. For example, tags in an embedded historian can be automatically created, and be set up as a default collection for a plant scan, such that when a plant comes on-line, the embedded historians announce their presence to such plant, and are discovered thereby. Moreover, the configuration of the embedded historians can include editing process variables, automation device names, creating tag references, data models, hierarchy, simulation of industrial processes, and the like. Based on such configuration, embedded historians can subsequently collect data related to the industrial process at 430. Such data can then be stored at a central collection at 440, for real time quality control.

Figure 5:
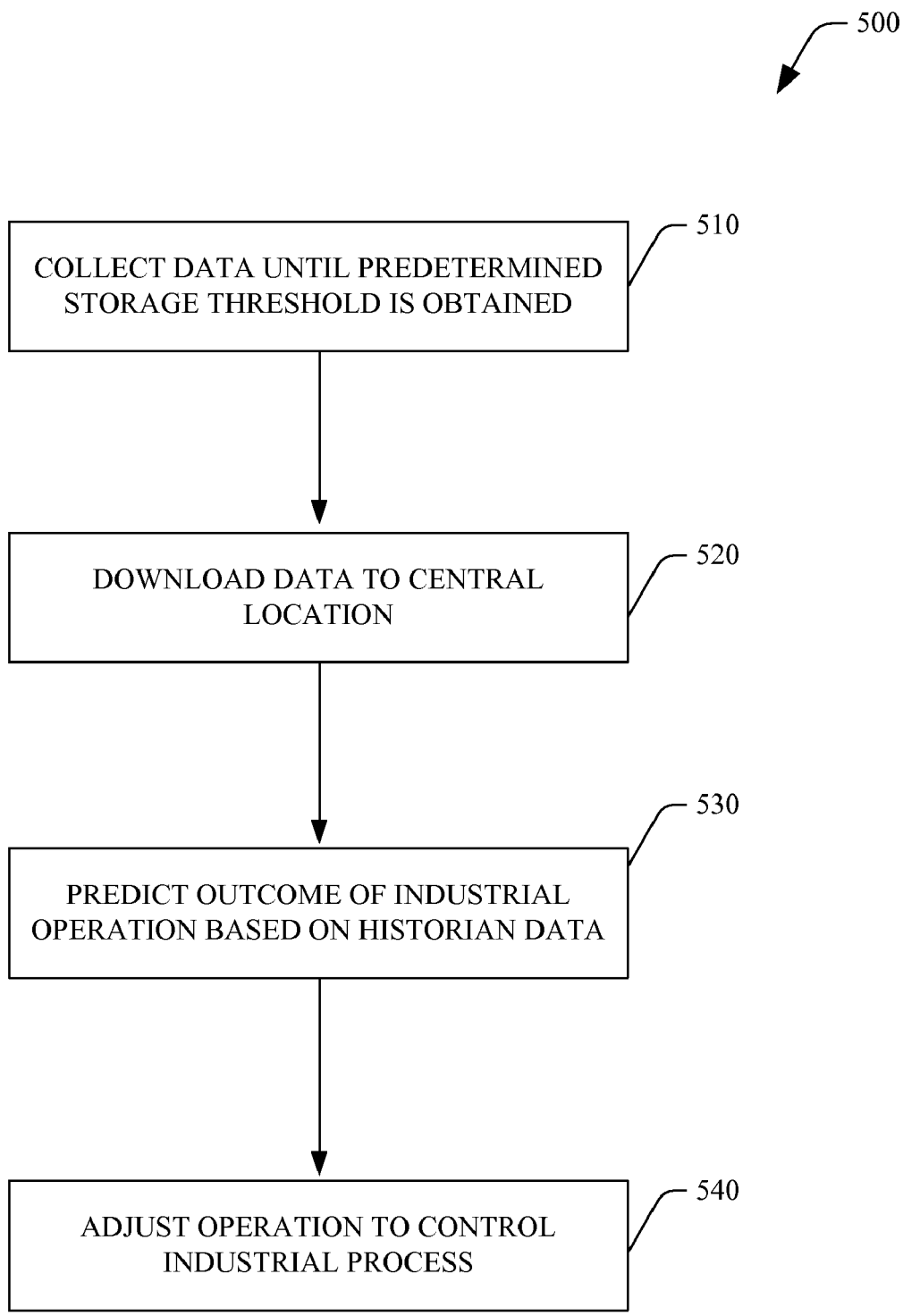
FIG. 5 illustrates a related methodology of operation prediction in accordance with an aspect of the subject innovation.

FIG. 5 illustrates a related methodology 500 of operation prediction in accordance with an aspect of the subject innovation. Data can be initially stored via embedded historians, wherein such storage can continue until a predetermined threshold is reached at 510. Upon reaching such predetermined threshold and at 520, an automatic download can download stored data in such embedded historians to a central plant historian. Upon completion of data transfer to the central plant historian, and based on such collected data, a prediction can be made at 530 regarding type of results to be expected from operation of the industrial unit. Subsequently, based on such prediction, relatively immediate actions can be taken to control the industrial process at 540, as process parameter can be readily modified.

Figure 6:
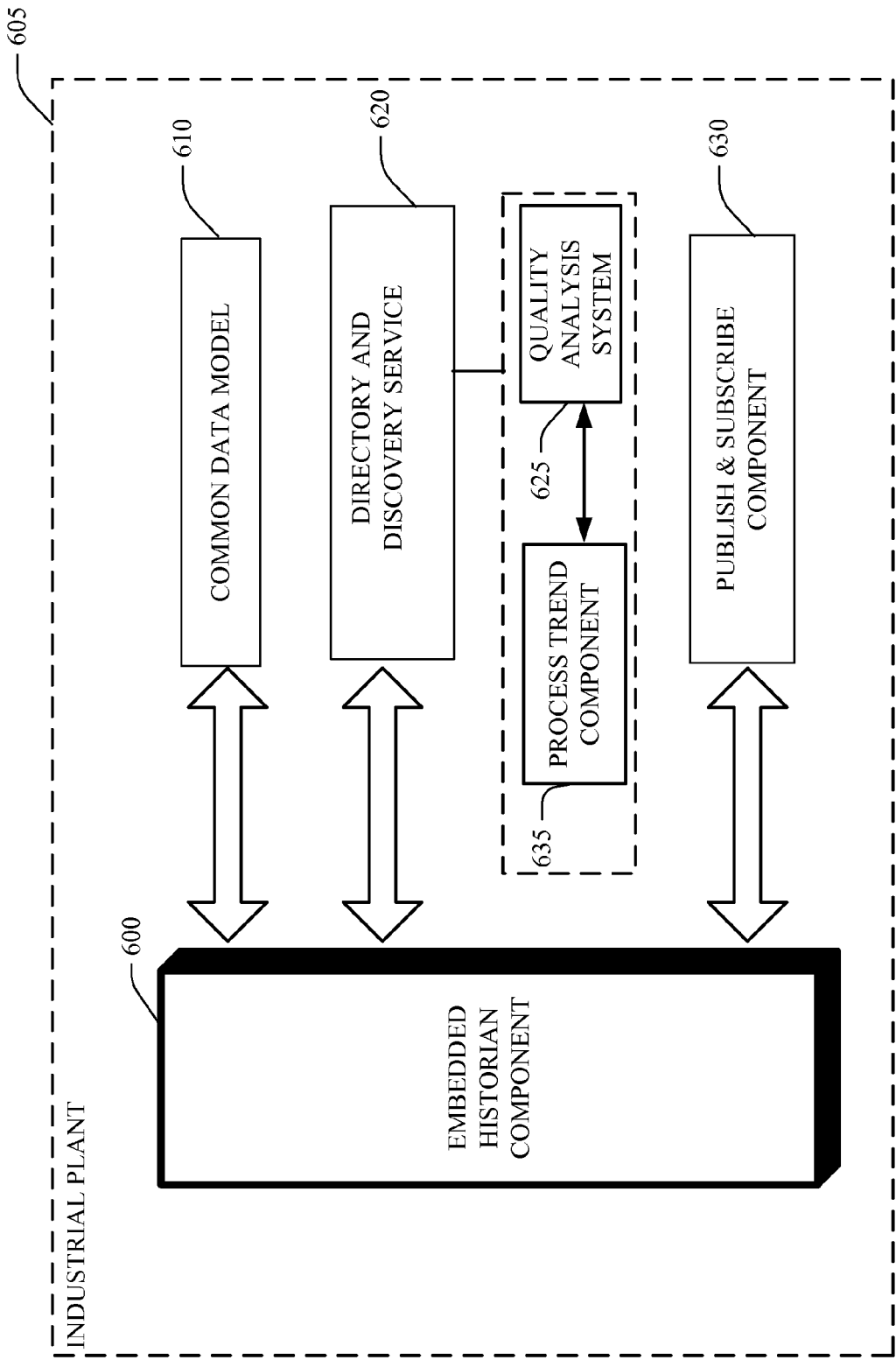
FIG. 6 illustrates a process trend component that is associated with a quality analysis system in accordance with an aspect of the subject innovation.

FIG. 6 illustrates a process trend component 635 that is associated with a quality analysis system 625, which interact with the embedded historian network/embedded historians 600 in accordance with an aspect of the subject innovation. The industrial setting 605 can employ a hierarchical data model with various levels; e.g., enterprise level, site level (factory represented within a data packet), area level (an area within the factory associated with the data); line level (a line associated with particular data), a work-cell level (that indicates a work-cell associated with the data) and the like. For example by employing a nested, hierarchical data model, embedded historian components 600 can readily become aware of data associated therewith. Furthermore, such hierarchy can further be customized by users to obtain increased granularity within the hierarchy. The common plant model can enable the embedded historian component 600 to determine data contexts in an automated manner. The common data model 610 allows data to be marked or labeled via metadata for example to both expose embedded historian functionality to a system and/or to allow the embedded historian component 600 to be automatically integrated within the system according to data that is exposed to the embedded historian component. For example, one such labeling can pertain to security, and typically can affect substantially all components in the system associated with the common model 610. Such an arrangement enables collected data by the embedded historian component 600 to be converted into decision making information that is subsequently employed for modifying a process in real time, for example. embedded historian component. For example, one such labeling can pertain to security, and typically can affect substantially all components in the system associated with the common model 610. Such an arrangement enables collected data by the embedded historian component 600 to be converted into decision making information that is subsequently employed for modifying a process in real time, for example.

Figure 7:
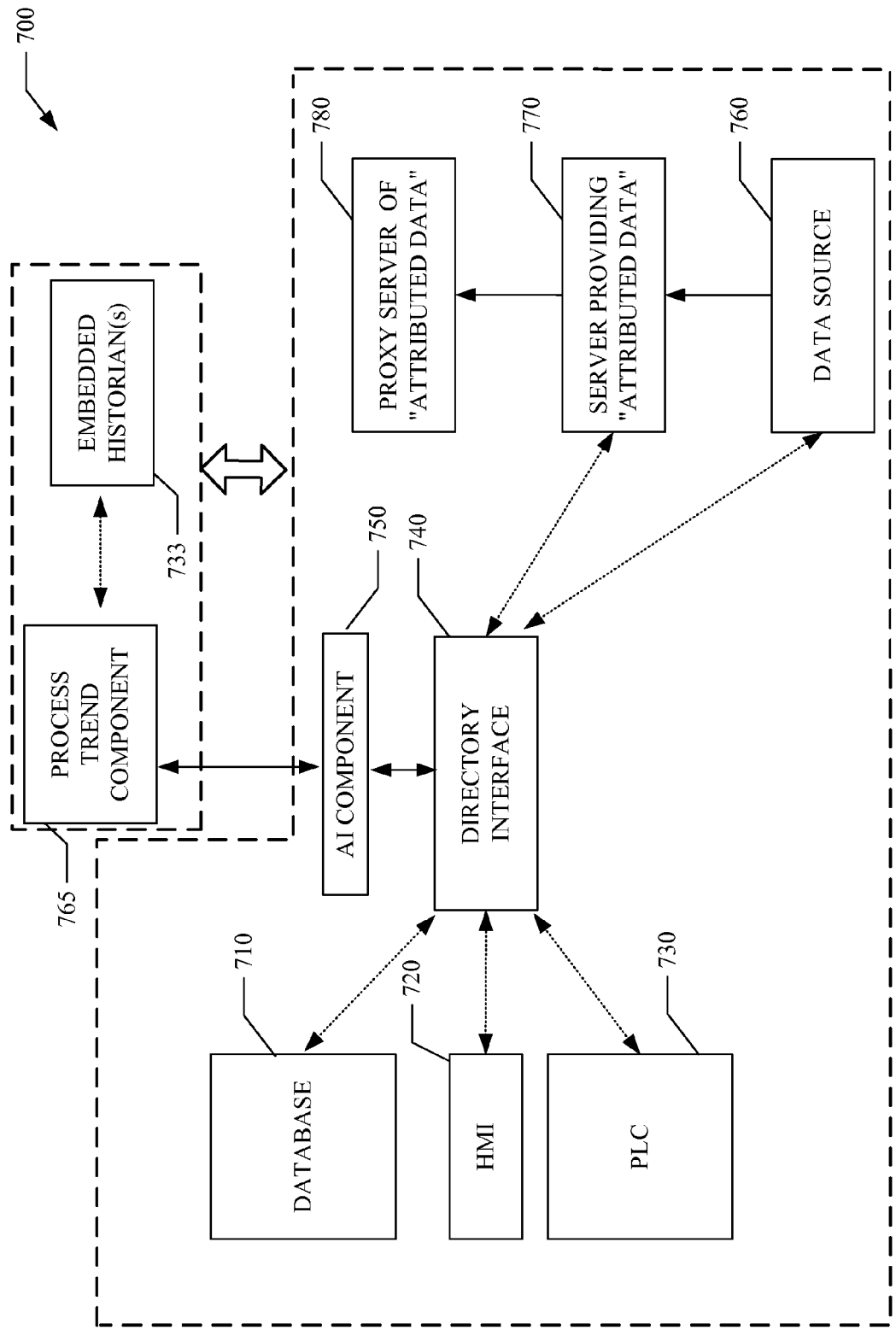
FIG. 7 illustrates an exemplary industrial automation network that employs a process trend component and an embedded historian component, to enable high speed data collection for predicting process outcome of the industrial setting.

Moreover, the publish and subscribe component 630 can provide subscription functionality to the embedded historian component 600, wherein data collection efficiency of the system can be enhanced. For example, the publish and subscribe component 630 of the system 605 allows data to be published or generated when a change in the data has been detected. Thus, the embedded historian component 600 can subscribe to such change events, and hence only record data when a change has occurred, and reduce the amount of data to be stored. Furthermore, a trail of metadata can further be employed to identify embedded historians and relevant historian data for collection. Additionally, a polling/publication arrangement can also be employed wherein the embedded historians (e.g., micro—historians) identify themselves to the locator component for a configuration thereof, upon occurrence of a predetermined event, and/or periodically. a4,AMD FIG. 7 illustrates an exemplary industrial automation network that employs a process trend component 765, which interacts with an embedded historian component 733, to enable high speed data collection (e.g., real time) for predicting process outcome of the industrial setting 700. Such system 700 can include a database 710, a human machine interface (HMI) 720 and a programmable logic controller (PLC) 730, and a directory interface 740. The directory interface 740 can further associate with an Artificial Intelligence (AI) component 750 to facilitate efficient identification of desired data within a particular network/application. For example, in connection with predicting outcome of the industrial process and/or real time adjustment of such process, the subject invention can employ various artificial intelligence schemes. A process for learning explicitly or implicitly predicting an outcome of the process can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\text{confidence}(\text{class})$. As illustrated in FIG. 7, the artificial intelligence (AI) component 750 can further be employed to facilitate inferring and/or determining when, where, how to predict an outcome based on data collected by the embedded historians. The AI component 750 can employ any of a variety of suitable AI-based schemes as described supra in connection with facilitating various aspects of the subject invention.

Moreover, the directory interface 740 can be employed to provide data from an appropriate location such as the data source 760, a server 770 and/or a proxy server 780. Accordingly, the directory interface 740 can point to a source of data based upon role and requirements (needs) of a requester (e.g., database 710, HMI 720, PLC 730, and the like.) The database 710 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Accordingly, particular ERP applications can require data that has certain desired attributes associated therewith. Thus, in accordance with an aspect of the subject invention, the directory interface 740 can provide data to the database 710 from the server 770, which provides data with the attributes desired by the database 710.

As illustrated in FIG. 7, by associating historians to the process trend component 765 and quality procedures, timely, tighter and more stringent controls can be applied to the automation process 700, thus increasing overall quality in an automated manufacturing environment. Moreover, the HMI 720 can employ the directory interface 740 to point to data located within the system 700. Also, the HMI 720 can graphically display various aspects of a process, system, factory, and the like to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 720 can request data to have particular visualization attributes associated with data in order to easily display such data thereto. For example, the HMI 720 can query the directory interface 740 for a particular data point that has associated visualization attributes. The directory interface 740 can determine that the proxy server 780 contains the attributed data point with the desired visualization attributes. For instance, the attributed data point can have a particular graphic that is either referenced or sent along with the data such that this graphic appears within the HMI environment instead of or along with the data value.

The PLC 730 can be any number of models such as Allen Bradley PLC5, SLC-500, MicoLogix, and the like. The PLC 730 is generally defined as a specialized device employed to provide high-speed, low-level control of a process and/or system. The PLC 730 can be programmed using ladder logic or some form of structured language. Typically, the PLC 730 can utilize data directly from a data source (e.g., data source 760) that can be a sensor, encoder, measurement sensor, switch, valve and the like. The data source 760 can provide data to a register in a PLC, and such data can be stored in the PLC if desired. Additionally, data can be updated (e.g., based on a clock cycle) and/or output to other devices for further processing.

Figure 8:
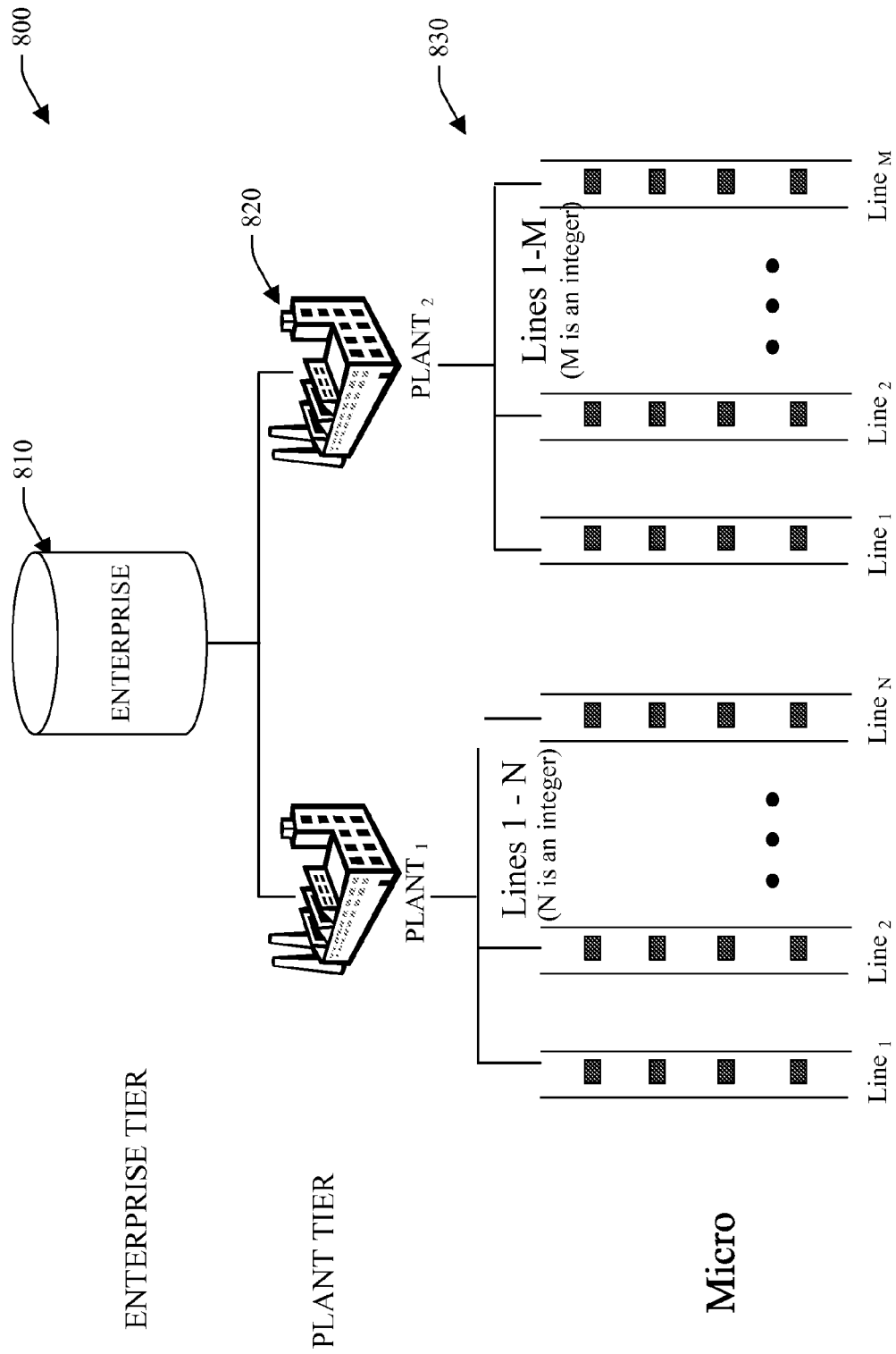
FIG. 8 illustrates an exemplary multi-tiered and distributed historian system, which can convert data into decision making process in accordance with an aspect of the subject innovation.

FIG. 8 illustrates an exemplary multi-tiered and distributed historian system 800, which can convert data into decision making process via a process trend component (not shown), in accordance with an aspect of the subject innovation. The exemplary system 800 illustrates three tiered historian level, wherein the highest data collection tier is illustrated and can be referred to as the enterprise tier 810. This tier aggregates data collected from lower level tiers such as from a plant tier 820 and a micro or embedded tier 830. As illustrated, the tiers 810 and 820 can include archival or permanent storage capabilities. In the system 800, data can be collected from two plants at the tier 820, and from a plurality of historian components at tier 830. It is to be appreciated that such an arrangement is exemplary in nature, and other arrangements are well within the realm of the subject innovation.

Typically, the system 800 can be viewed as a Distributed Historian that spans machines, plants, and enterprises. At level 830, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 820 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 830. Other features of the system 800 can include analysis components, logical units, components for interaction with report elements, embeddable presentation components, replication of configuration, storage, archiving, data compression, summarization/filtering, security, and scalability.

Figure 9:
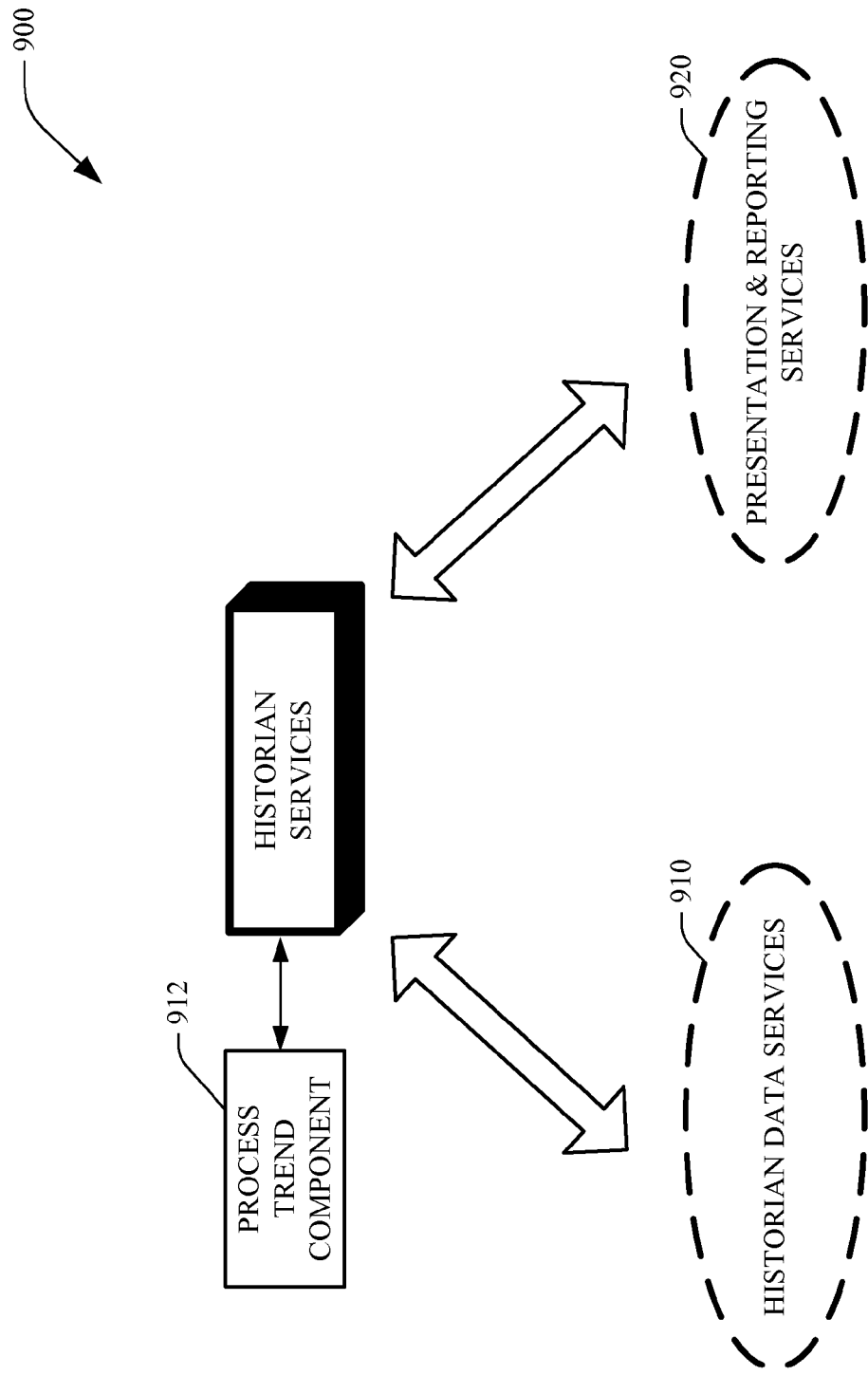
FIG. 9 illustrates historian services, which can employ a process trend component that predicts outcome of the automation process in accordance with an aspect of the subject invention.

FIG. 9 illustrates historian services 900, which can employ a process trend component 912 that predicts outcome of the automation process in accordance with an aspect of the subject invention. The historian services 900 can include historian data services 910 and presentation and reporting services 920. Historian Data Services 910 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 920 (PRS) can supply generic, customizable services for collating and presenting data in a common plant model-defined context. This can include access to stored data, analysis/calculators and query mechanisms, and embeddable, interactive presentation components (e.g., text, charts, SPC). The service 910 can generate reports with various means of presentation/distribution (e.g., web, email) having export capabilities to standard formats (e.g., XML, Excel).

Figure 10:
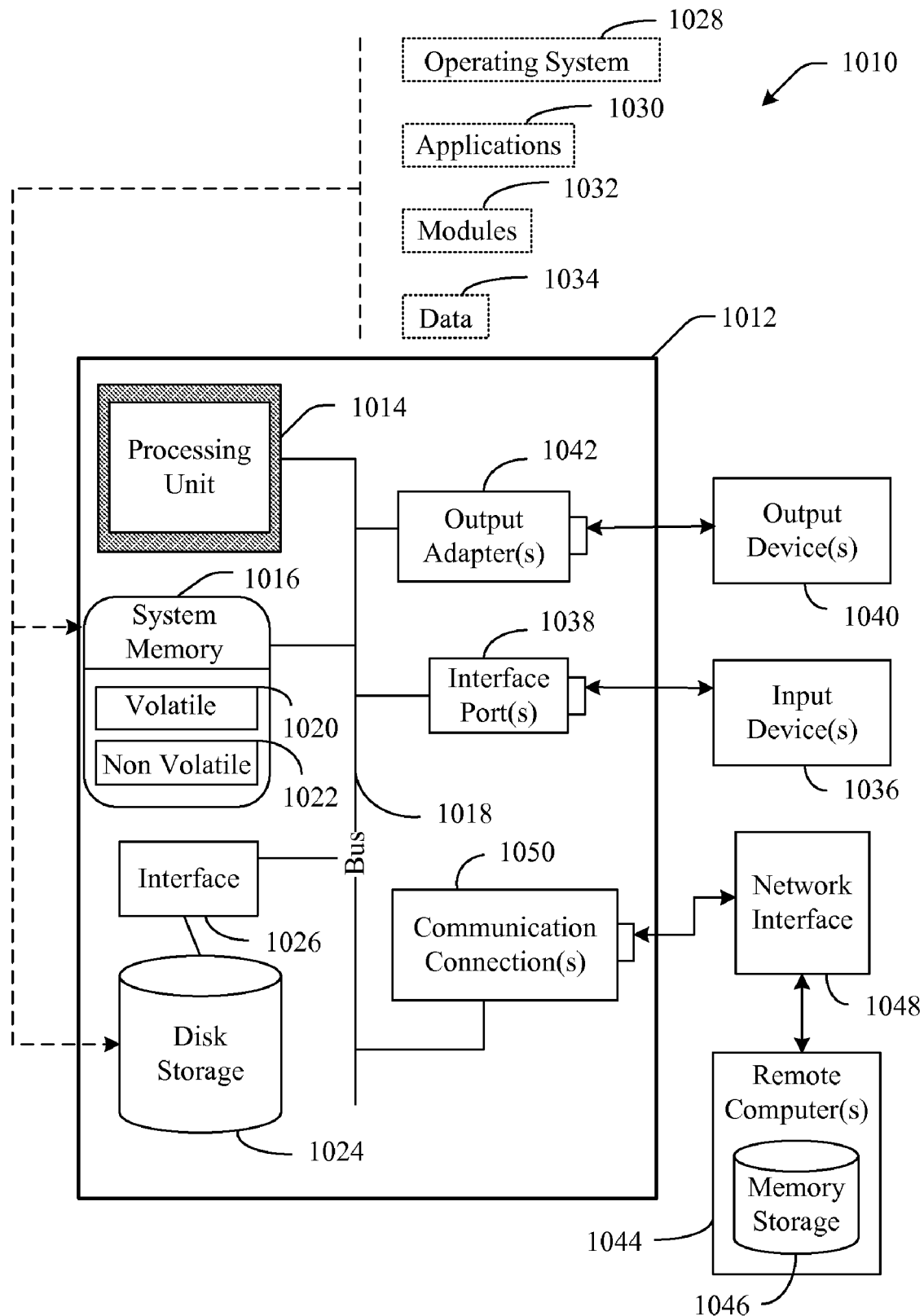
FIG. 10 illustrates an exemplary environment for implementing various aspects of the process trend component, in accordance with an aspect of the subject innovation.

FIG. 10 illustrates an exemplary environment 1010 for implementing various aspects of the process trend component, which includes a computer 1012, as part thereof. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

It is noted that as used in this application, terms such as "component," "hierarchy," "model," and the like are intended to refer to electromechanical units, and/or a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith. Also, the word "exemplary" is used herein to mean serving as an example, instance, or illustration. Any aspect or design described herein as "exemplary" is not necessarily to be construed as preferred or advantageous over other aspects or designs.

Figure 11:
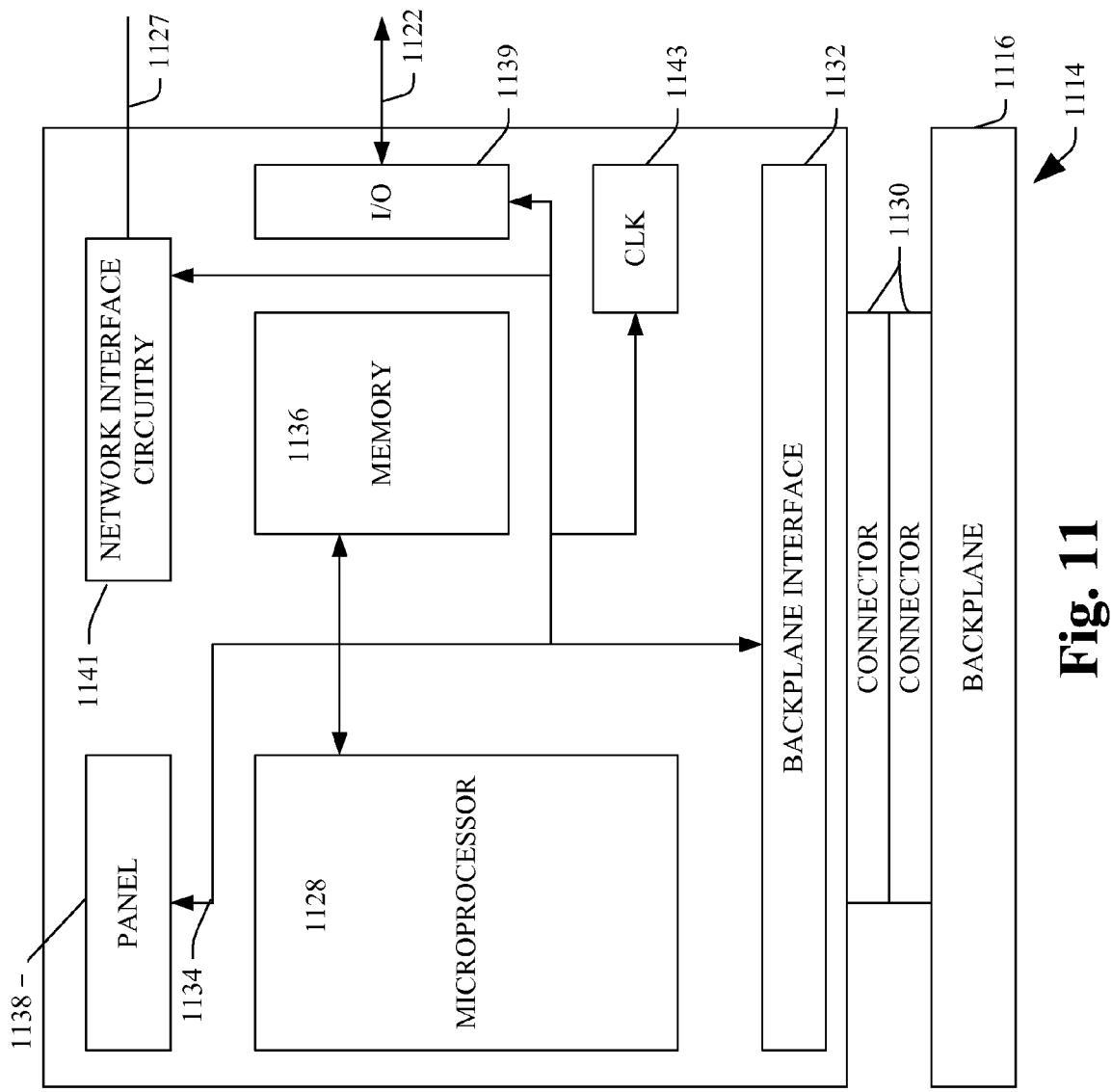
FIG. 11 illustrates an additional environment for employing embedded historians to predict outcome of the automation process, according to an aspect of the subject innovation.

FIG. 11 illustrates an addition environment for employing embedded historians to predict outcome of the automation process, wherein each functional module 1114, is attached to the backplane 1116 by means of a separable electrical connector 1130 that permits the removal of the module 1114 from the backplane 1116 so that it may be replaced or repaired without disturbing the other modules 1114. The backplane 1116 provides the module 1114 with both power and a communication channel to the other modules 1114. Local communication with the other modules 1114 through the backplane 1116 is accomplished by means of a backplane interface 1132 which electrically connects the backplane 1116 through connector 1130. The backplane interface 1132 monitors messages on the backplane 1116 to identify those messages intended for the particular module 1114, based on a message address being part of the message and indicating the message destination. Messages received by the backplane interface 1132 are conveyed to an internal bus 1134 in the module 1114.

The internal bus 1134 joins the backplane interface 1132 with a memory 1136, a microprocessor 1128, front panel circuitry 1138, I/O interface circuitry 1139 and communication network interface circuitry 1141. The microprocessor 1128 can be a general purpose microprocessor providing for the sequential execution of instructions included within the memory 1136 and the reading and writing of data to and from the memory 1136 and the other devices associated with the internal bus 1134. The microprocessor 1128 includes an internal clock circuit (not shown) providing the timing of the microprocessor 1128 but may also communicate with an external clock 1143 of improved precision. This clock 1143 may be a crystal controlled oscillator or other time standard including a radio link to an external time standard. The precision of the clock 1143 may be recorded in the memory 1136 as a quality factor. The panel circuitry 1138 includes status indication lights such as are well known in the art and manually operable switches such as for locking the module 1114 in the off state.

The memory 1136 can comprise control programs or routines executed by the microprocessor 1128 to provide control functions, as well as variables and data necessary for the execution of those programs or routines. For I/O modules, the memory 1136 may also include an I/O table holding the current state of inputs and outputs received from and transmitted to the industrial controller 1110 via the I/O modules 1120. The module 1114 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A process control system, comprising:
one or more processors;
at least one memory communicatively coupled to the one or more processors, the at least one memory having stored thereon computer-executable components configured to implement the system, the computer-executable components comprising:
at least one embedded historian configured to collect data associated with at least one process implemented by an industrial system, wherein the at least one embedded historian is configured to employ an organizational data model representing the industrial system and distributed across at least two system components within the industrial system to locate at least a subset of the data; and
a process trend component configured to generate a prediction of an outcome of the at least one process based on an analysis of the data,
wherein the at least one embedded historian is configured to adjust a granularity of data collection based on the prediction.

2. The industrial system of claim 1, further comprising a quality analysis system configured to perform a quality analysis of the data and to generate a quality prediction for the at least one process.

3. The industrial system of claim 1, wherein the at least one embedded historian is associated with at least one of a controller, a module in a chassis, a server, a sensor, or a factory component.

4. The industrial system of claim 1, the organizational data model is configured to employ metadata to identify at least a subset of the at least one embedded historian to a discovery component.

5. The industrial system of claim 1, further comprising a publish and subscribe component configured to identify at least a subset of the at least one embedded historian to a discovery component.

6. The industrial system of claim 1, wherein the process trend component is configured to modify at least one parameter associated with the at least one process based on the prediction.

7. The industrial system of claim 1, wherein the organizational data model defines at least two hierarchical levels for the industrial system.

8. The industrial system of claim 1, wherein the plurality of embedded historians are configured to collect the data at a first hierarchical level of the industrial system defined by the organizational data model and to aggregate the data at a second hierarchical level of the industrial system defined by the organizational data model, wherein the second hierarchical level is higher than the first hierarchical level.

9. A method of adapting an industrial process within an industrial plant comprising:
distributing a hierarchical data model of the industrial plant among at least two system devices residing on one or more hierarchical levels of the industrial plant;
collecting historian data related to the industrial process using a plurality of embedded historians distributed among the at least two system devices and associated with the hierarchical model, wherein the collecting comprises employing the hierarchical data model to locate at least a portion of the historian data;
generating a prediction of a result of the industrial process via analysis of the historian data; and
adjusting a granularity of data collection for at least one of the plurality of embedded historians based on the prediction.

10. The method of claim 9, further comprising automatically downloading the historian data to a central plant historian.

11. The method of claim 10, wherein the automatically downloading comprises automatically downloading the historian data upon reaching a predetermined storage threshold.

12. The method of claim 9, further comprising employing a directory to track a source of the historian data.

13. The method of claim 12, further comprising servicing at least one of the plurality of embedded historians via a database.

14. The method of claim 9, wherein the collecting the historian data comprises recording the historian data in response to a detected change in the historian data.

15. The method of claim 9, further comprising defining at least two hierarchical levels within the hierarchical data model.

16. The method of claim 15, wherein the collecting the historian data comprises:
collecting the historian data at a first tier of the industrial plant corresponding to a first hierarchical level of the at least two hierarchical levels; and
aggregating the historian data at a second tier of the industrial plant corresponding to a second hierarchical level of the at least two hierarchical levels, wherein the second tier is higher than the first tier.

17. The method of claim 9, further comprising adjusting at least one parameter of the industrial process based on the prediction.

18. An industrial controller system comprising:
means for representing an organization as a hierarchical data model distributed among at least two devices within the organization;
collection means for collecting historian data related to an industrial process using one or more embedded historians;
means for locating the collection means using the hierarchical data model; and
means for predicting an outcome of the industrial process via analysis of the historian data; and
means for adjusting a granularity of data collection by the collection means based at least in part on a prediction of the outcome of the industrial process generated by the means for predicting.

* * * * *